Nov. 27, 1934.    J. H. BANINGER    1,982,366
BEARING MOUNTING
Filed April 8, 1932

INVENTOR:
JOHN H. BANINGER,
BY
HIS ATTORNEY

Patented Nov. 27, 1934

1,982,366

UNITED STATES PATENT OFFICE 1,982,366

BEARING MOUNTING

John H. Baninger, Bristol, Conn., assignor, by mesne assignments, to General Motors Corporation, Detroit, Mich., a corporation of Delaware Application April 8, 1932, Serial No. 603,932

11 Claims. (Cl. 29—84)

This invention relates to bearing mountings and comprises all of the features of novelty herein disclosed. An object of the invention is to provide an improved mounting for insuring the firm contact of a bearing race ring in its seat. Another object is to provide a bearing mounting having improved features of construction that insure proper fits without liability of wasting parts by improper machining. Another object is to provide an improved method of seating and preloading antifriction bearings.

Figure 1:
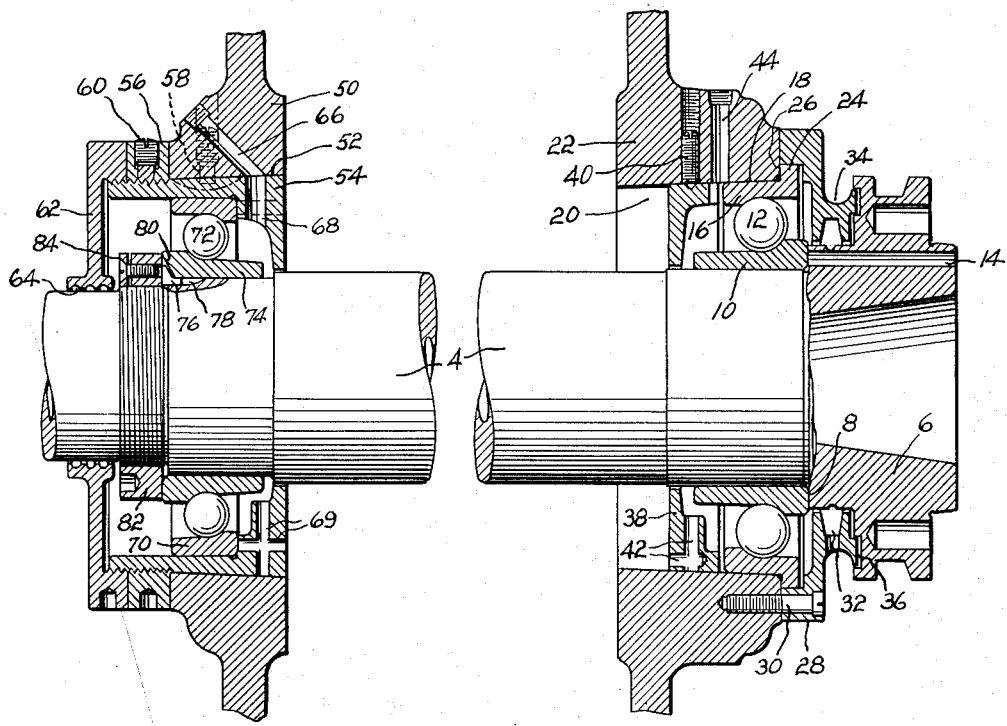

To these ends and to improve generally upon devices of this character, the invention consists in the various matters hereinafter described and claimed. In its broader aspects, the invention is not necessarily limited to the specific construction selected for illustrative purposes in the accompanying drawing in which Fig. 1 is a longitudinal section, broken away in the center, of the improved bearing mounting.

Figure 2:
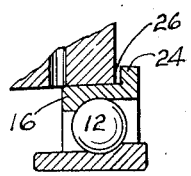

Fig. 2 is a detail sectional view showing an initial position of a race ring and its seat.

The numeral 4 indicates a hollow shaft such as the driven shaft of a lathe having an enlargement 6 suitably formed to cooperate with a chuck (not shown). An abutment or shoulder 8 on the enlargement abuts against a wide inner race ring 10 of an antifriction bearing 12, an opening 14 providing for removal of the race ring from the shaft. An outer race ring 16 having its outer surface 18 conical fits tightly in the conical bore or seat 20 of a housing wall 22. The race ring is provided with an abutment flange 24 to abut against a flat abutment face 26 on the housing wall. The flange 24 is annular and projects from the race ring at right angles to its axis. A closure plate 28 is piloted on the periphery of the flange 24 and is secured to the housing wall by screws 30, the closure plate having a suitable internal drain groove 32, an external drain groove 34 and a rib 36 to make a tight joint with the enlargement 6. A flanged washer 38 is fastened in the bore or seat 20 by a set screw 40 and is provided with passages 42 forming oil overflow openings. Oil is admitted between the race ring and the flanged washer through an opening 44.

The housing wall 22 is a part of, or suitably connected to, a housing wall 50 having a conical bore or seat 52 concentric with the conical bore or seat 20. A flanged cup or casing 54 having a conical outer wall fits in the bore or seat 52 and is threaded at one end to receive a nut 56 which screws up against a face of the housing wall 50 to clamp the cup in its seat. A pin 58 enters a slot in the cup to hold it from rotation when the nut is set up, and a set screw 60 clamps the nut to the cup. A threaded closure plate 62 screws on the cup and is provided with grease grooves 64 at the shaft. Lubricant is admitted to the interior of the cup 54 through registering passages 66 and 68 in the housing and cup. The cup is provided with passages 69 forming oil overflow openings and with a shouldered seat receiving the outer race ring 70 of an antifriction bearing 72. A wide inner race ring 74 has a push fit or light drive fit with the shaft 4 for axial sliding adjustment thereon. A key 76 entering registering slots 78 and 80 in the race ring and the shaft holds the ring from turning with respect to the shaft while an adjusting nut 82 shifts the ring endwise to adjusted position. The nut 82 has suitable locking means at 84.

Both antifriction bearings are preferably ball bearings and are of the angular contact type with the angles of contact diverging toward the shaft. The bearings are given an initial internal load and a firm metal-to-metal contact of the race ring 16 with its seat 20 is insured by making the outer conical surface of the race ring 16 of a size to lightly engage its seat when the flange 24 stands a given small distance away from the face 26 as indicated in Fig. 2. In other words, the two cones (which are alike and therefore can only coincide in one position) are made to coincide when there is a given initial distance between the flange and the face. Thus, when the nut 82 is partly set up, the flange engages the face while the race ring is compressed to fit tightly in its seat. Some internal load is then upon the bearings and any desired additional load can be obtained by further turning of the nut but the flange prevents any additional or undue compression of the race ring other than that desired for a firm fit in the seat. The provision of the conical seats also provides a very valuable means of correcting or compensating for inaccuracies in manufacture without liability of having to reject parts that are over-machined. For instance, if the distance between the flange 24 and the face 26 is initially too small, the face 26 can be ground off to allow the requisite amount of movement of the race ring 16 into its conical seat. If the distance between flange 24 and face 26 is initially too large (indicating that the conical seat 20 is too small for the race ring 16), the conical seat 20 can be scraped or reamed to allow the race ring to enter further into its seat. A true fit, with tight metal-to-metal contact, can thus always be obtained without making and machining new castings whereas a cylindrical seat, for instance, if initially too large, cannot be corrected. The two conical seats can be formed at one machining operation to insure a similar taper and concentricity. The inner race rings 10 and 74 are made wide to minimize any tendency to cock or tilt by reason of non-uniform pressure exerted by an inaccurate shoulder or an inaccurate adjusting nut. The nut at 56 is intended merely to clamp the tapered cup 54 while the nut 82 preferably applies the initial load by sliding the shaft through or with respect to the race ring 74.

I claim:

1. In a bearing mounting, a shaft, a housing having a tapering seat, an angular contact bearing between the shaft and the housing and comprising an inner race ring, an outer race ring and rolling elements, the outer race ring having a tapering outer surface to fit in said tapering seat, a flange on said race ring, and means for causing axial movement of the shaft with respect to the housing to compress the outer race ring into its tapering seat with the flange against an abutment face; substantially as described.

2. In a bearing mounting, a shaft, a housing, one of said members having a tapering seat terminating at an abutment face, an angular contact bearing between the shaft and the housing and comprising an inner race ring, an outer race ring and rolling elements, one of said race rings having a tapering surface terminating in a flange, the flange and the abutment face being initially spaced apart when the tapering surface lightly engages the tapering seat, and means for causing relative axial movement between the shaft and the housing to bring the flange and the abutment face in contact, with the tapering surface forcibly engaging the tapering seat; substantially as described.

3. In a bearing mounting, a shaft, a housing, one of said members having a conical seat and the other having a shoulder, an angular contact bearing between the shaft and the housing and comprising an inner race ring, an outer race ring and a row of rolling elements, one of the race rings having a conical surface engaging the conical seat and the other race ring engaging the shoulder, and means for forcing the shoulder axially with respect to the conical seat to force the conical surface of the race ring against its conical seat; substantially as described.

4. In a bearing mounting, a shaft, a housing having a conical seat terminating in an abutment face, an antifriction bearing of angular contact type between the shaft and the housing, the outer race ring of the bearing having a conical surface terminating in a flange, the flange and the abutment face having a small clearance when the conical surface and the conical seat initially engage one another, and means for forcing the outer race ring into its tapering seat until the flange engages the abutment face; substantially as described.

5. In a bearing mounting, a shaft, a housing having a seat, an antifriction bearing between the shaft and the housing and engaging the seat, a flanged washer secured in the seat and extending close to the shaft, means for introducing lubricant through the housing and between the washer and the bearing, and the lower portion of the washer having overflow passages; substantially as described.

6. In a bearing mounting, a shaft having an abutment, a pair of housing walls having openings, opposed angular contact bearings in said openings and each comprising an inner race ring, an outer race ring and a row of rolling elements, one of said inner race rings engaging the abutment on the shaft, the corresponding outer race ring having a tapering surface, the corresponding opening in the housing wall being similarly tapered to form a seat for the tapering surface, means for holding the remaining outer race ring from axial movement, and means for sliding the shaft through the remaining inner race ring to compress the first mentioned outer race ring into its tapering seat; substantially as described.

7. In a bearing mounting, a shaft having an abutment, a pair of housing walls having conical seats, opposed angular contact bearings between the shaft and the seats and each comprising an outer race ring, an inner race ring and a row of rolling elements, one of the outer race rings having a conical surface engaging one of the conical seats, the corresponding inner race ring engaging the abutment on the shaft, a casing holding the other outer race ring and having a conical outer wall engaging the other conical seat, the other inner race ring having a slidable contact with the shaft, and means for causing relative axial movement between the shaft and said other inner race ring; substantially as described.

8. In a bearing mounting, a shaft having an abutment, a pair of housing walls having tapering seats, opposed angular contact bearings, each comprising an inner race ring, an outer race ring and a row of rolling elements, one of said inner race rings engaging the abutment on the shaft, the corresponding outer race ring having a tapering surface engaging the tapering seat in one of the housing walls, a casing holding the remaining outer race ring and having a tapering surface engaging the tapering seat on the other housing wall, and a nut on the shaft and engaging the remaining inner race ring; substantially as described.

9. In a bearing mounting, a shaft having an abutment, a pair of housing walls having tapering seats, opposed angular contact bearings, each comprising an inner race ring, an outer race ring and a row of rolling elements, one of said inner race rings engaging the abutment on the shaft, the corresponding outer race ring having a tapering surface engaging the tapering seat in one of the housing walls, a casing holding the remaining outer race ring and having a tapering surface engaging the tapering seat on the other housing wall, a nut on the shaft and engaging the remaining inner race ring, means for forcing the casing into its tapering seat, and means for causing relative movement of the shaft with respect to the remaining inner race ring; substantially as described.

10. The method of seating an antifriction bearing, which consists in mounting a conically surfaced race ring in no-pressure contact with a conical seat, and in forcing the race ring a predetermined distance along said conical seat from the point of no-pressure contact to a point wherein the race ring is forcibly pressed radially against its seat; substantially as described.

11. The method of seating and preloading an antifriction bearing, which consists in mounting a conically surfaced race ring in no-pressure contact with a conical seat, forcing the race ring endwise along said conical seat from the point of no-pressure contact to a point wherein the race ring is forcibly pressed radially against its seat and against the rolling elements of the bearing, and limiting the amount of axial movement and radial distortion on such race ring; substantially as described.

JOHN H. BANINGER.